F. W. MEYER.
CONTROLLING AND REGULATING APPARATUS AND SYSTEM.
APPLICATION FILED MAR. 8, 1920.

1,410,702.

Patented Mar. 28, 1922.
2 SHEETS—SHEET 1.

Inventor
Friedrich W. Meyer
Edwin B. H. Tower Jr
Atty.

F. W. MEYER.
CONTROLLING AND REGULATING APPARATUS AND SYSTEM.
APPLICATION FILED MAR. 8, 1920.

1,410,702.

Patented Mar. 28, 1922.
2 SHEETS—SHEET 2.

Inventor
Friedrich W. Meyer
Edwin B. H. Torrey Jr.
Atty.

UNITED STATES PATENT OFFICE.

FRIEDRICH WILHELM MEYER, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLING AND REGULATING APPARATUS AND SYSTEM.

1,410,702.   Specification of Letters Patent.   Patented Mar. 28, 1922.

Application filed March 8, 1920. Serial No. 364,070.

*To all whom it may concern:*

Be it known that I, FRIEDRICH WILHELM MEYER, a citizen of Germany, residing at Milwaukee, in the county of Milwaukee and State of Wisconsin, have invented new and useful Improvements in Controlling and Regulating Apparatus and Systems, of which the following is a specification.

This invention relates to controlling and regulating apparatus and systems.

It is particularly applicable to the regulation and control of dynamo electric machines, although it is not limited to such use.

The regulation and control of a dynamo electric machine for variations in load and power conditions may be accomplished by means of an electroionic valve of the arc discharge type.

Arc discharge regulation and control is particularly applicable for heavy duty dynamo electric machines requiring large currents, although not limited to such use.

Such regulation and control depends somewhat upon the natural extinguishing effect of the arc current pulses and is very sensitive and powerful especially when dealing with low frequency alternating currents.

An object of this invention is to improve arc discharge control and regulation.

Another object is to provide an arc discharge control and regulating system wherein the extinguishment of the arc is controlled and regulated.

Another object is to control and regulate direct current arc discharges.

Other objects and advantages will appear from the following description.

In accordance with the present invention the discharge in an arc discharge path associated with a dynamo electric or other machine to be regulated is controlled and regulated by varying the ignition and extinguishment of the arc in accordance with the varying operating conditions to which the machine is subject.

Embodiments and adaptations of the invention are diagrammatically shown in the accompanying drawings, but it is to be understood that these are merely for the purpose of illustration and that many other embodiments may be made and will readily occur to those skilled in the art.

Figure 1:
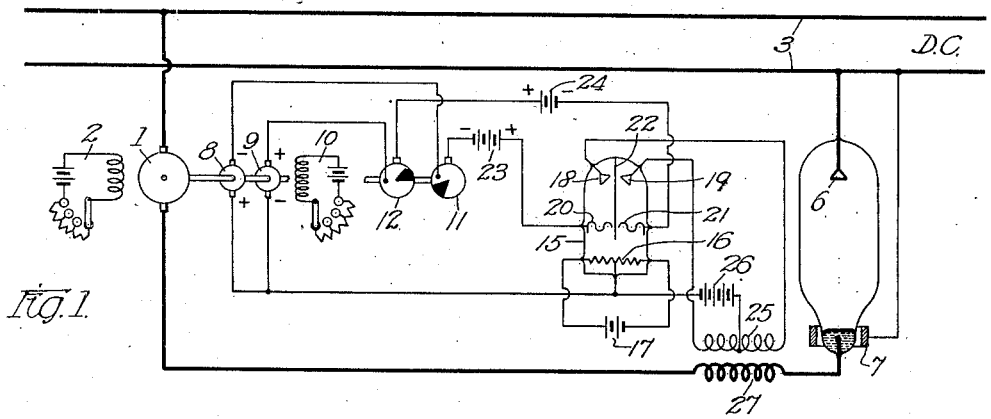
Figure 1 illustrates a system for controlling and regulating a direct current motor through a direct current arc discharge included in the armature circuit thereof.

Figure 1 will first be described.

Figure 1 shows a direct current motor supplied with operating current from a direct current line through an arc discharge and controlled and regulated for changes in load, speed, line voltage, etc. by varying the time of ignition and extinguishment of the arc.

The motor has an armature 1 and an adjustable separately excited field 2. The armature brushes are connected with opposite sides of the direct current line 3. An arc discharge path is included in circuit with the motor armature for regulating the motor.

This arc discharge path is between electrodes included in a vessel or chamber 4 which is evacuated to any desired degree and contains a suitable vapor, such as argon. The vessel 4 contains a cathode 5 and an anode 6. A band 7 surrounding the lower and reduced portion of the vessel 4 is connected with the side of the line to which anode 6 is connected. This band 7 is for the purpose of assisting in starting an arc between the cathode and the anode, which arc is included in the motor armature circuit. However, such a starting band is not always necessary.

A small direct current generator or tachometer machine having two armatures 8 and 9 is driven directly from the motor shaft and thus simulates the operating conditions of the motor. The tachometer machine has an adjustable separately excited field 10. The motor shaft also drives two contact discs 11 and 12 to which one brush of each tachometer armature 8 and 9 are respectively connected. Of course, other means may be employed for driving the contact discs 11 and 12. For example, the movement of these discs may, if desired, be entirely independent of the motor.

An electroionic valve with relay effects controlled by the tachometer in turn controls the ignition and extinguishment of the arc between the arc discharge electrodes.

This electroionic relay comprises a vessel 15 evacuated to the desired degree or filled with a gas such as, for example, mercury vapor or argon. The vessel contains a cathode 16, which may be heated by a battery 17 two anodes 18 and 19, and two auxiliary anodes 20 and 21, which may take the form of grids. The vessel may be provided with a suitable partition 22, which separates the anodes 18 and 19 and prevents a discharge therebetween, when because of the size and arrangement of the vessel these electrodes are near together. However, the partition is not always necessary. Of course, any other well known form of electroionic valves or relays may be used if desired. For example, two simple electroionic valves or relays of the usual construction may be employed instead of the one illustrated.

The middle of the cathode 16 is connected with one brush of each tachometer armature. The grid 20 is connected through a battery 23 with the brush of contact disc 11, while the other grid 21 is connected through a battery 24 with the brush of contact disc 12. Each contact disc is provided with an insulated section whereby the circuits in which the contact discs are connected may be periodically interrupted. The anodes 18 and 19 are respectively connected with opposite ends of a transformer primary 25, the middle of which is connected through a battery 26 with the middle of the cathode 16. The transformer secondary 27 is connected in circuit with the arc discharge path between the cathode 5 and anode 6.

The circuits including the batteries 23 and 24 and the tachometer armatures comprise the sensitive or control circuits of the electroionic relay. The batteries oppose the tachometer, and either the batteries or the tachometer may normally predominate slightly, depending upon what effects it is desired to produce.

The currents, if any, carried by the control or sensitive circuits are of extremely low magnitude. Consequently it is entirely possible to rapidly interrupt such circuits without danger of injury to the contacts by which the circuits are interrupted. Contacts are therefore employed in the control circuits to produce sharply defined controlling effects in the controlled circuits which may carry currents of considerable magnitude. If contacts were employed in such controlled circuits, such contacts would be subjected to destructive sparking due to the magnitude of the currents, and sharply defined controlling effects could not be obtained because of the sparking at the contacts.

By employing make and break contacts in the control circuit of an electroionic valve or relay whose controlled circuit includes a transformer primary it is possible to produce in the transformer secondary very high momentary induced voltages upon interruption and closure of the control circuit when the grid potential of the electroionic relay is sufficient.

The tachometer being driven directly by the shaft of the machine to be regulated injects into the system no mechanical inertia affecting the regulation and control. Since the currents necessary to create the required grid potentials are extremely small, the induction of the tachometer windings is practically nil. It is also apparent that the grid potentials, being the difference between the battery and tachometer voltages, is greatly affected by even slight changes in the speed of the machine to be regulated. A change in grid potential therefore occurs practically simultaneously or coincidently with a change in speed of the machine being regulated.

The operation of the system is as follows:

When the motor speed increases the speed of the tachometer also increases. The armatures thereof generate greater voltages. This increase in generated voltage causes the tachometer voltages to predominate over the battery voltages. The resulting decreased potential of the grid 20 causes a greatly magnified effect upon the circuit including the cathode 16 and the anode 18. The resulting increased potential of the grid 21 causes a greatly magnified effect in the circuit including the cathode 16 and the anode 19. When the sensitive circuit of grid 21 is interrupted at the insulated segment of the contact disc 12, the consequent interruption in the circuit including the cathode 16 and the anode 19 produces a high counter electromotive force through section $25^b$ of the transformer primary 25. A momentary high voltage is thereby induced in the transformer secondary 27. This momentary voltage is in opposition to the line voltage, and is of sufficient magnitude to extinguish the arc, thereby interrupting the arc discharge. The current supply to the motor is thereby interrupted, whereby a corrective effect is supplied to the motor.

The closure of the sensitive circuit of grid 21, when the contact disc 12 again engages its brush, causes a momentary voltage to be induced in the transformer secondary 27. While this induced voltage is in a direction to aid the line voltage, still it is not high enough to cause the ignition of an arc between the cathode 5 and anode 6.

Following the closure of the sensitive circuit of grid 21, the insulating segment of contact disc 11 interrupts the sensitive circuit of grid 20. The resulting counter electromotive force in section 25ª of the transformer primary induces a momentary voltage in the transformer secondary 27. This momentary induced voltage while in a direction to aid the line voltage is not high enough to cause ignition of the arc unless the speed of the motor has dropped sufficiently after the extinguishing of the arc. The succeeding closure of the sensitive circuit of grid 20 by the engagement of contact disc 11 with its brush causes a momentary voltage to be induced in the transformer secondary 27. This induced voltage is of less magnitude than that induced upon the opening of the sensitive circuit of grid 20, and is in a direction opposing the line voltage.

The motor speed decreases upon the extinguishment of the arc, resulting in a decrease in voltage generated by the tachometer armatures. The voltage difference between the tachometer and the batteries therefore increases, thereby decreasing the potential difference between the cathode 16 and the grid 21 and increasing the potential difference between the cathode 16 and the grid 20.

When the sensitive circuit of grid 20 is thereafter interrupted at the insulated segment of contact disc 11, the high counter electromotive force of the transformer primary section 25ª induces a high momentary voltage in the transformer secondary 27. This momentary voltage aids the line voltage and the voltage impressed between the cathode 5 and the starting or igniting band 7 is sufficient to cause the ignition of an arc between the cathode 5 and the anode 6. Operating current is therefore again supplied to the motor. The closure of the sensitive circuit of grid 20 following the opening thereof causes a momentary voltage to be induced in the transformer secondary 27. This induced voltage in the transformer secondary, while opposing the line voltage, is not of sufficient magnitude to cause the interruption of the arc.

Normally the momentary voltage induced in the transformer secondary 27 as a result of the opening and closing of the sensitive circuits of grids 20 and 21 are not of sufficient magnitude to cause either the ignition or extinguishment of the arc.

Figure 2:
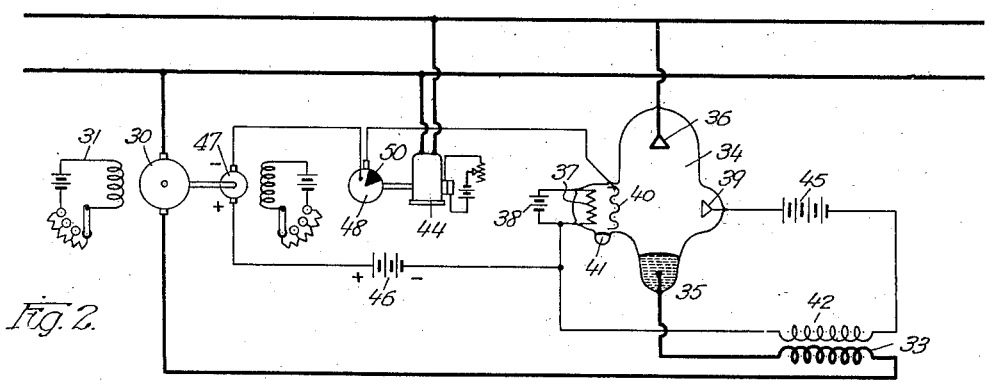
Fig. 2 illustrates a modification of the system shown in Fig. 1.

Figure 2 shows a direct current motor which operates on current supplied from a direct current line through an electroionic arc discharge valve of the type disclosed in my copending application Serial No. 364,071, filed March 8, 1920.

The motor has an armature 30 and an adjustable separately excited field 31. The upper brush of the armature is connected with one side of the direct current line 32, while the other brush is connected through a transformer secondary 33 and an electroionic arc discharge valve 34 with the other side of the line.

The electroionic arc discharge valve comprises a vessel 34 evacuated to the desired degree. This vessel may be filled with a vapor such as argon or may be arranged to produce its own vapor. This vessel contains a cathode 35 of suitable material such as mercury and an anode 36 between which is the arc discharge path.

The vessel also contains electrodes for controlling and regulating the discharge between the cathode 35 and anode 36. These electrodes which constitute an electroionic valve or relay comprise a cathode 37, which may be heated by a battery 38, an anode 39 and an auxiliary anode 40 which may take the form of a grid. If the combined electroionic arc discharge valve 34 is to produce its own vapor, a small pocket of suitable vaporizable material 41, such as, for example, mercury, may be provided in proximity to the heated cathode 37.

One terminal of the cathode 37 is connected to one end of a transformer primary 42, the other end of which is connected through a battery 45 to the anode 39. One end of the cathode 37 is also connected through an opposing battery 46 with one side of the tachometer 47, the other side of which is connected through contact disc 48 and associated brush to the grid 40. The battery 46 opposes the tachometer 47, with the battery normally predominating to maintain a potential upon the grid 40, whereby the arc extinguishing effect is obtained.

The tachometer or small direct current generator 47 which is driven directly by the motor shaft and thus simulates the operation of the motor is provided with an adjustable separately excited field 49. The contact disc 48 driven by a synchronous motor 44 carries an insulating segment 50 which opens the sensitive circuit once during each revolution of the motor shaft. Since the contact disc 48 is driven by a separate motor, the speed of the disc is independent of the motor which is being regulated and controlled. If desired the number of insulating segments carried by the contact disc may be increased. Each time that the sensitive circuit is interrupted the counter electromotive force in the transformer primary 42 induces a high momentary voltage in the transformer secondary 33. This momentary voltage opposes the line voltage and is always of sufficient magnitude and is created so suddenly as to cause the extinguishment of the arc. The ignition of the arc is controlled by the closure of the sensitive circuit and ignition takes place if and when the grid potential is sufficient. The number, duration and magnitude of the current pulsations to the motor are thus controlled and regulated.

If the motor increases slightly in speed, the tachometer speed likewise increases. The increased voltage generated by the tachometer decreases the grid potential. This causes a greatly magnified effect in the circuit including the cathode 37 and anode 39, which, however, does not affect the extinguishing of the arc, the extinguishing of the arc being independent of changes in speed of the motor. When the sensitve circuit is next interrupted, the arc is extinguished. When the sensitive circuit is next closed, the counter electromotive force of the transformer primary induces a momentary voltage in the transformer secondary. This induced voltage aids the line voltage, but due to the low grid potential, it is not of sufficient magnitude to ignite the arc. Therefore one or more current pulsations are eliminated and the proper corrective effect is thus applied to the motor.

As the motor speed decreases, the grid potential increases. When the grid potential is high enough the momentary voltage induced in the transformer secondary upon the closure of the sensitive circuit is then of sufficient magnitude to cause the ignition of the arc. The increased grid potential also causes an increased ionization in the vessel 34, which aids in igniting the arc between the cathode 35 and the anode 36.

The time of ignition being thus determined, the number, duration and magnitude of the current pulsations to the motor are controlled and regulated in accordance with the changes in operating conditions to which the motor is subject.

Instead of interrupting the sensitive circuit to produce the arc extinguishing effect, a sudden reduction of difference in potential between the cathode and grid may be effected by short circuiting the grid and cathode. This may be accomplished by arranging the contact disc and brush to periodically close a short circuit for the grid and cathode. It might be advisable under such circumstances to include in the sensitive circuit a protective resistance for the tachometer and battery.

Figure 3:
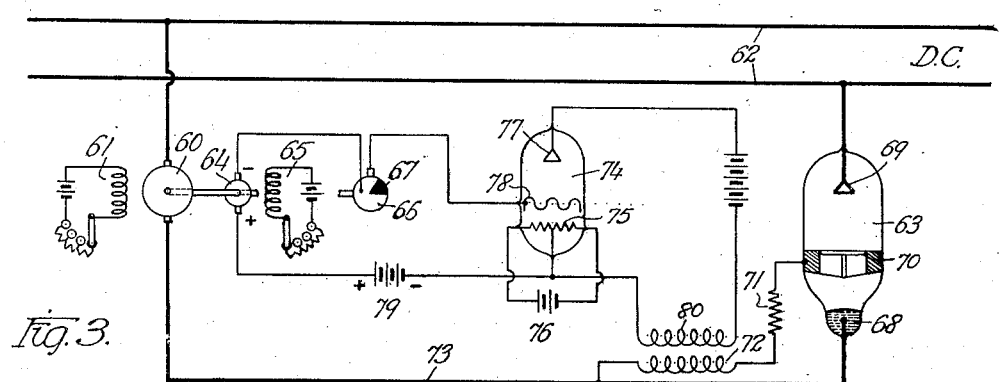
Fig. 3 illustrates another modification of the system shown in Fig. 1.

Fig. 3 shows a direct current motor which is operated by current supplied from a direct current line through an electroionic valve of the arc discharge type.

The motor is provided with an armature 60 and an adjustable separately excited field 61. The upper armature brush is connected with one side of a direct current line 62, while the other brush is connected through an electroionic arc discharge device 63 with the other side of the line.

A small direct current generator or tachometer machine 64 is driven directly from the motor shaft and thus simulates the operating conditions of the motor. This tachometer is provided with an adjustable separately excited field 65. The motor shaft also drives a contact disc 66 which is provided with an insulating segment 67. The contact disc may, of course, be driven independently of the motor, if desired. One of the brushes of the tachometer is connected with the contact disc 66.

The electroionic arc discharge valve 63 comprises a vessel evacuated to the desired degree and may be filled with a suitable gas such as, for example, argon. The vessel contains a cathode 68 of suitable material such as, for example, mercury, and an anode 69. The vessel also contains a starting or ignition electrode 70 which is connected through a resistance 71 and a transformer secondary 72 to conductor 73. The electrode 70 may be made of any suitable material such as, for example, silundum. The electrode 70 is pointed as shown to facilitate the ignition of the arc, and is provided with openings through which passes the arc discharge between the cathode 68 and anode 69.

An electroionic valve 74 controlling the arc discharge of the valve 63 comprises a vessel evacuated to the desired degree or filled with a gas such as, for example, mercury vapor or argon. The vessel contains a cathode 75 heated from a battery 76, an anode 77 and auxiliary anode 78 which may take the form of a grid.

The mid point of the cathode 75 is connected with a brush of the tachometer, while the grid 78 is connected with a brush which cooperates with the contact discs 66.

A battery 79 connected in the sensitive circuit opposes the tachometer 64 and normally predominates slightly thereover. The mid point of the cathode 75 is also connected with one end of a transformer primary 80, the other end of which is connected through a battery 81 to the anode 77.

For each revolution of the motor shaft, the sensitive circuit is interrupted by the engagement of insulating segment 67 with the brush. Each time that an interruption occurs, the counter electromotive force in the transformer primary 80 induces a high momentary voltage in the transformer secondary 72. This momentary voltage is impressed between the electrode 70 and the cathode 68 and is in a direction to produce a counter field which opposes the arc discharge between the cathode 68 and anode 69.

The magnitude of this counter field is sufficient and is created so suddenly as to extinguish the arc. During the operation of extinguishing the arc between the cathode 68 and anode 69, an arc may be established between the electrode 70 and the anode 69, which, however, due to the presence of high resistance 71 is prevented from persisting after the cessation of the induced high momentary voltage. The ignition of the arc is controlled by the closure of the sensitive circuit and ignition takes place if and when the grid potential is sufficient. The number, duration and magnitude of the current pulsations to the motor are thus controlled and regulated.

If the motor increases slightly in speed, the tachometer speed likewise increases. The tachometer thereupon generates an increased voltage, which in turn decreases the potential difference between the grid and the cathode. A greatly magnified diminishing effect is in turn produced in the controlled circuit of the electroionic relay 74. Thus when the sensitive circuit is closed following the extinguishment of the arc, the counter electromotive force in the transformer primary 80 induces a momentary voltage in the transformer secondary 72. This induced voltage is in the proper direction to aid the line voltage but due to the low grid potential may not be of sufficient magnitude to cause the ignition of the arc. One or more current pulsations may thus be eliminated and the proper corrective effect is applied to the motor. As the motor speed decreases, the grid potential increases. When the grid potential is high enough the momentary voltage induced in the transformer secondary upon the closure of the sensitive circuit is then of sufficient magnitude to cause ignition of the arc. This induced voltage is impressed between the electrode 70 and the cathode 68 and ignites an arc therebetween which in turn causes the ignition of the arc between the cathode 68 and the anode 69.

The time of ignition being thus determined, the number, duration and magnitude of the current pulsations to the motor are controlled and regulated in accordance with the changes in operating conditions to which the motor is subject.

Figure 4:
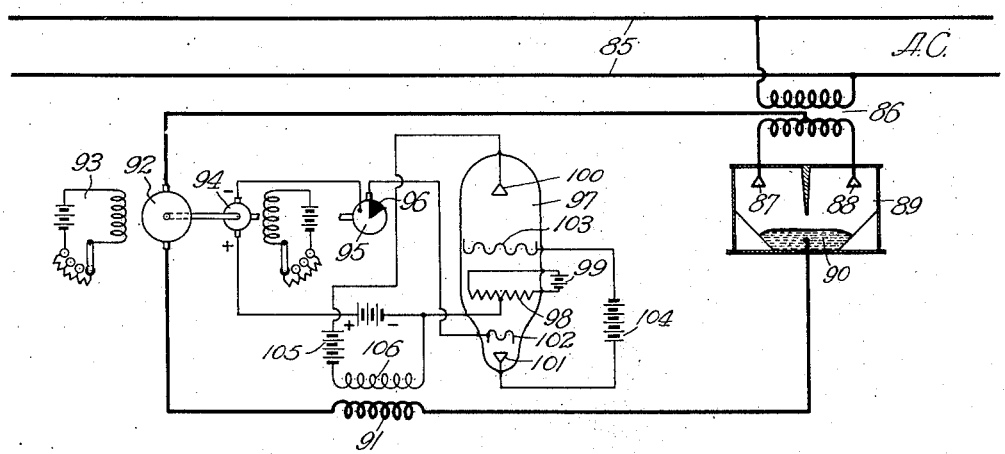
Fig. 4 illustrates a system in which a direct current motor is operated by current supplied from an alternating current source.

Figure 4 shows a direct current motor supplied with operating current from an alternating current line.

The operating current for the direct current motor is supplied from the alternating current line 85 through a transformer 86, the opposite ends of the secondary of which are connected with anodes 87 and 88 of a double wave arc discharge rectifier valve 89. The rectifier valve comprises an evacuated chamber of suitable material such as, for example, steel, and filled with a suitable gas, such as, for example, mercury vapor or argon. The rectifier is provided with a cathode 90 which is connected through a transformer secondary 91 to one brush of the motor armature 92. The other brush of the motor armature is connected to the mid point of the secondary of the transformer 86.

The motor is provided with an adjustable separately excited field 93. A tachometer machine 94 is driven directly from the motor shaft and thus simulates the operating conditions thereof. A contact disc 95 having an insulated segment 96 is also driven from the motor shaft, the contact disc 95 being connected with one brush of the tachometer machine. Other means may, of course, be employed for driving the contact disc.

An electroionic valve 97 cooperative with the tachometer machine for controlling and regulating the ignition and extinguishment of the arc in the arc discharge rectifier valve to thereby compensate for varying conditions to which the motor is subject.

This electroionic valve, which is of the self-intensifying type disclosed in Meyer Patent 1,369,457, granted February 22, 1921, comprises an evacuated vessel having a cathode 98 heated by a battery 99. The vessel also has a main anode 100, an auxiliary anode 101, and other auxiliary anodes 102 and 103 which may take the form of grids.

The auxiliary anode 101 is connected through a battery 104 to the grid 103. The grid 102 is connected with the cooperating brush of the contact disc 95, and the mid-point of the cathode 98 is connected with a brush of the tachometer machine 94 through an opposing battery 107. The anode 100 is connected through a battery 105 and a transformer primary 106 to the mid-point of the cathode 98. A slight change of grid potential produces a greatly magnified change in the circuit including the cathode 98 and anode 100. The grid potential increases with a decrease in motor speed.

The extinguishing of the arcs between the cathode 90 and the anodes 87 and 88 takes place automatically upon the cessation of the half waves of alternating current.

The ignition of the arcs is controlled by interrupting the sensitive circuit. The interruption of the sensitive circuit causes a momentary voltage to be induced in the transformer secondary 91. The direction of this induced voltage is such as to aid the line voltage. When the grid potential is high enough, the momentary induced voltage will be of sufficient magnitude to cause the ignition of one or the other of the arcs.

If the motor increases slightly in speed the tachometer speed likewise increases. The voltage generated by the tachometer thereupon increases, and in turn the grid potential decreases. When the sensitive circuit is interrupted, the resulting momentary induced voltage in the transformer secondary, while in a direction to aid the particular half wave from the line, is not of sufficient magnitude to cause ignition of the arc. One or more current pulsations are thus eliminated and the proper corrective effect applied to the motor.

If the motor speed decreases slightly, the grid voltage increases. When the grid potential is high enough, the momentary voltage induced in the transformer secondary as a result of the opening of the sensitive circuit is of sufficient magnitude to cause the ignition of one or the other of the arcs. Current pulsations are again supplied to the motor, thus applying the proper corrective effect thereto.

Figure 5:
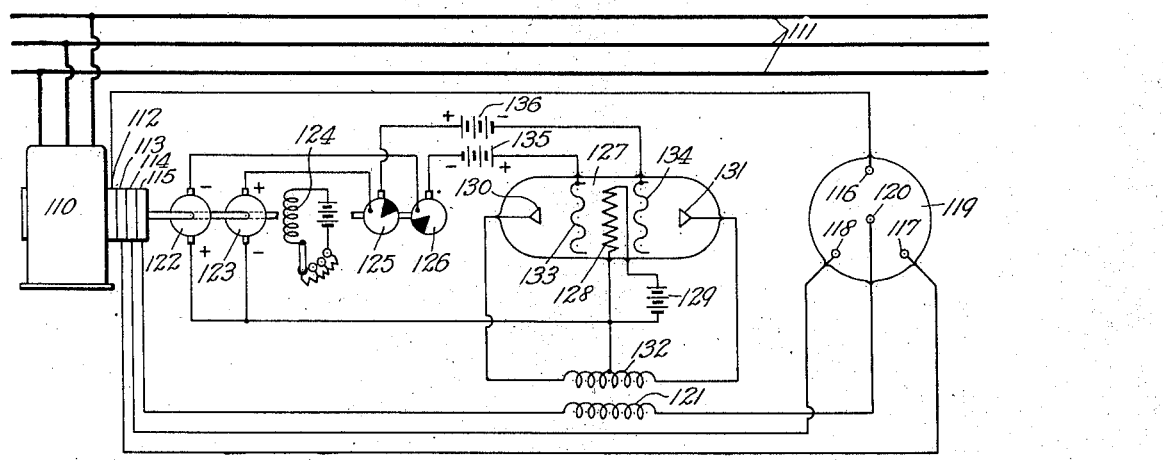
Fig. 5 illustrates a system in which an induction motor is controlled and regulated through the secondary thereof.

Figure 5 shows an induction motor 110 supplied with operating current from a 3-phase alternating current line 111. Variations in load and supply conditions to which the motor is subjected are compensated for by varying the current in the secondary of the motor.

The motor is provided with the usual slip rings 112, 113, 114 and 115. The slip rings 112, 113 and 114 are connected with anodes 116, 117 and 119 of the electroionic arc discharge valve 119. The electroionic arc discharge valve is also provided with a cathode 120, connected through a transformer secondary 121 with the slip ring 115 which is connected to the neutral point of the motor secondary.

A small direct motor generator or tachometer machine having two armatures 122 and 123 is driven directly from the motor shaft and thus simulates the operating conditions of the motor. The tachometer is provided with an adjustable separately excited field 124. Two contact discs 125 and 126, each provided with an insulating segment, may be driven directly from the motor shaft, or if desired by some other means entirely independent of the motor.

An electroionic valve or relay 127 cooperates with the tachometers to control the time ignition and extinguishment of arcs in the arc discharge valve 119. This electroionic relay comprises an evacuated vessel having a cathode 128 heated by a battery 129. The vessel also contains two anodes 130 and 131 connected to opposite ends of a transformer primary 132. The vessel is also provided with two auxiliary anodes 133 and 134, which may take the form of grids.

One end of the cathode 128 is connected with the middle point of the transformer primary 132 and also with the lower brushes of the tachometer armatures 122 and 123. The grid 133 is connected with one terminal of a battery 135, the other terminal of which is connected with the cooperating brush of the contact disc 126. The grid 134 is connected with one terminal of the battery 136, the other terminal of which is connected with the cooperating brush of the contact disc 125.

The batteries 135 and 136 and the tachometer armatures 122 and 123 are connected in the sensitive circuits of the electroionic valve 127. These batteries are connected in opposition of the tachometers and normally predominate slightly thereover.

The operation of the system of Fig. 5 is similar to the operation of the system of Fig. 1.

When the motor speed increases the speed of the tachometer also increases. The armatures thereof generate greater voltages. This increase in generated voltage causes an increase in potential difference between the cathode and one of the grids and a decrease in potential difference between the cathode and the other grid. Thereafter when the sensitive circuit, including the grid whose potential has been thus increased, is suddenly opened, or the difference in potential between this grid and the cathode is otherwise suddenly reduced a greatly magnified effect is produced in the circuit controlled thereby which includes one section of the transformer primary 132. The high counter electromotive force in this one section of the transformer primary 132, caused by the sudden reduction in potential difference between the cathode and one of the grids induces in the transformer secondary a high momentary voltage. This momentary induced voltage opposes the voltage of the secondary of the motor, and is of sufficient magnitude to extinguish the arc between the cathode 120 and one of the anodes. The proper corrective effect is thereby applied to the motor.

A decrease in motor speed causes a high momentary voltage to be induced in the transformer secondary 121. This induced voltage is produced by the counter electromotive force in the other section of the transformer primary when the other sensitive circuit is interrupted. This induced voltage aids the voltage of the motor secondary. The high voltage impressed between the cathode 120 and one of the anodes is sufficient to ignite the arc therebetween. The proper corrective effect is therefore applied to the motor.

What is claimed is:

1. A regulator for regulating machines subject to variations in load and power conditions, having in combination an electroionic valve of the arc discharge type for regulating said machine, and electroionic means subject to the varying conditions for controlling the extinguishment of the arc in said valve.

2. A system for regulating machines subject to variations in load and power conditions, having in combination an electroionic valve of the arc discharge type for regulating said machine, and electroionic inductive means subject to the varying conditions for controlling and regulating the extinguishment of the arc in said valve.

3. A system for regulating machines subject to variations in load and power conditions, comprising an electroionic valve of the arc discharge type for regulating said machine, and electroionic means subject to the varying conditions for controlling and regulating the ignition and extinguishment of the arc in said valve in accordance with the varying conditions.

4. In combination, a dynamo electric machine subject to variations in load and power conditions, an electroionic valve of the arc discharge type for controlling and regulating said machine to compensate for such variations, a tachometer driven by said machine and under the influence of the varying conditions, and electric circuits operatively connecting the tachometer and said valve whereby the extinguishment of the arc in said device is regulated and controlled.

5. In combination, a dynamo electric machine subject to variations in load and power conditions, an electroionic valve of the arc discharge type for controlling and regulating said machine to compensate for such variations, and electroionic means under the influence of the varying conditions for controlling and regulating the extinguishment of the arc in said valve.

6. In combination, a dynamo electric machine subject to variations in load and power conditions, an electroionic valve of the arc discharge type for controlling and regulating said machine to compensate for such variations, and means coincidently responsive to the varying conditions for controlling and regulating the ignition and extinguishment of the arc in said valve.

7. A regulator for regulating machines subject to variations in load and power conditions having in combination an electroionic valve of the arc discharge type for regulating said machine for such variations, means coincidently responsive to such variations, and electroionic inductive means interlinking said responsive means and said valve whereby the ignition and extinguishment of the arc in said valve are controlled and regulated.

8. A regulator for regulating machines subject to variations in load and power conditions having in combination an electroionic valve of the arc discharge type for regulating said machine for such variations, means responsive to such variations, and electroionic inductive means interlinking said responsive means and said valve whereby the extinguishment of the arc in said valve is controlled and regulated.

9. A system for regulating dynamo electric machines subject to variations in load and power conditions having in combination an electroionic valve of the arc discharge type having a discharge path included in the load circuit of the machine, and means subject to such variations for regulating the ignition and extinguishment of the arc across said path in accordance with the varying conditions.

10. A system for regulating dynamo electric machines subject to variations in load and power conditions having in combination, an electroionic valve of the arc discharge type having a discharge path included in the load circuit of the machine, and means including an electroionic relay subject to such variations for regulating the ignition and extinguishment of the arc across said path in accordance with the varying conditions.

11. A system for regulating a dynamo electric machine subject to variations in load and power conditions having in combination, an electroionic valve of the arc discharge type having a discharge path included in the load circuit of the machine, and means including an electroionic relay inductively linked with the discharge path subject to such variations for regulating the ignition and extinguishment of the arc across said path in accordance with the varying conditions.

In witness whereof, I have hereunto subscribed my name.

Dr. FRIEDRICH WILHELM MEYER.